(12) United States Patent
Randhawa

(10) Patent No.: US 11,338,744 B2
(45) Date of Patent: May 24, 2022

(54) ENCLOSED TOILET SYSTEM FOR A TRUCK

(71) Applicant: Sikander Singh Randhawa, Rancho Cucamonga, CA (US)

(72) Inventor: Sikander Singh Randhawa, Rancho Cucamonga, CA (US)

(*) Notice: Subject to any disclaimer, the term of this patent is extended or adjusted under 35 U.S.C. 154(b) by 0 days.

(21) Appl. No.: 17/409,891

(22) Filed: Aug. 24, 2021

(65) Prior Publication Data
US 2022/0055548 A1 Feb. 24, 2022

Related U.S. Application Data

(60) Provisional application No. 63/069,709, filed on Aug. 24, 2020.

(51) Int. Cl.
*B60R 15/04* (2006.01)

(52) U.S. Cl.
CPC .................... *B60R 15/04* (2013.01)

(58) Field of Classification Search
CPC .................................................. B60R 15/04
USPC ................... 4/321, 300, 315, 322, 323, 324
See application file for complete search history.

(56) References Cited

U.S. PATENT DOCUMENTS

| | | | | |
|---|---|---|---|---|
| 3,757,357 A | * | 9/1973 | Smith ..................... | F02M 25/00 4/458 |
| 4,261,613 A | * | 4/1981 | Alford .................. | B60P 3/1016 296/156 |
| 4,728,144 A | * | 3/1988 | Crean ....................... | B60P 3/32 296/156 |
| 4,785,483 A | * | 11/1988 | Wise ....................... | A47K 11/04 296/65.07 |
| 4,805,660 A | * | 2/1989 | Antos ..................... | B60R 15/04 137/202 |
| 4,892,349 A | * | 1/1990 | Sargent ................... | B60R 15/04 296/156 |
| 5,111,626 A | * | 5/1992 | Fortune ..................... | E04H 3/02 4/663 |

(Continued)

FOREIGN PATENT DOCUMENTS

| | | |
|---|---|---|
| BR | 102017013798 A2 | 1/2019 |
| DE | 202018105293 U1 | 10/2018 |
| EP | 3581438 A1 | 12/2019 |

*Primary Examiner* — Lori L Baker
(74) *Attorney, Agent, or Firm* — Binita J. Singh; Bold IP, PLLC

(57) ABSTRACT

One or more systems for an enclosed toilet may be mounted to an exterior of a big vehicle such as a truck. One or more systems for an enclosed toilet may be manufactured onto or mounted onto a trailer that may be hitched to a vehicle and towed. The embodiments for the toilet system comprise of a fully functional toilet which is operatively connected to a clean water tank and a waste tank. The clean water tanks and the waste tanks are also each provided with a temperature sensor, a heating element, a cooling element, and a level sensor. The various functions and systems of the toilet function may be electronically monitored and controlled. The one or more systems for a toilet system that may be used on a trailer also comprises of a shower area which has a gravity fed water tank that feeds into a shower head. The one or more systems herein is a fully independent system that provides easy access to a fully and independently functional toilet system.

27 Claims, 15 Drawing Sheets

(56) References Cited

U.S. PATENT DOCUMENTS

| Patent/Publication | Date | Name | Classification |
|---|---|---|---|
| 5,426,900 A * | 6/1995 | Springer | A47K 4/00 4/460 |
| 5,544,369 A * | 8/1996 | Roberts | E04H 1/1277 4/599 |
| 5,848,443 A * | 12/1998 | Waugh | B60R 15/04 4/458 |
| 6,029,707 A * | 2/2000 | Couch | B60R 15/00 137/565.37 |
| 6,079,770 A * | 6/2000 | Bocian | B60R 15/04 296/190.01 |
| 7,293,298 B2 * | 11/2007 | Cameron | B60R 15/04 137/615 |
| 7,313,833 B2 * | 1/2008 | Wee | B60R 15/04 4/458 |
| 8,449,239 B1 * | 5/2013 | Birkenstock | B60R 15/04 414/462 |
| 9,126,548 B1 * | 9/2015 | Alneaimi | B60R 15/04 |
| 9,170,720 B2 * | 10/2015 | Plate | H04R 1/025 |
| 9,925,932 B2 * | 3/2018 | Julian | E04H 1/1216 |
| 10,654,426 B1 * | 5/2020 | Keller | E03D 5/01 |
| 2003/0140409 A1 | 7/2003 | Johnson | |
| 2003/0154543 A1 * | 8/2003 | Sigler | E03D 11/16 4/300 |
| 2005/0055759 A1 * | 3/2005 | Cameron | B60R 15/04 4/321 |
| 2010/0269875 A1 | 10/2010 | Notermann | |
| 2012/0102635 A1 * | 5/2012 | Cheng | E04H 1/1216 4/476 |
| 2012/0167297 A1 * | 7/2012 | Poust | E04H 1/1205 4/321 |
| 2014/0373263 A1 * | 12/2014 | Plate | A47K 13/24 4/300 |
| 2015/0027941 A1 * | 1/2015 | White | E03D 7/00 210/209 |
| 2016/0198908 A1 * | 7/2016 | Hartdorn | A47K 3/024 4/568 |

* cited by examiner

ENCLOSED TOILET SYSTEM FOR A TRUCK

CROSS-REFERENCE TO RELATED APPLICATION

This application is a non-provisional application which claims priority to U.S. Provisional Patent Application No. 63/069,709 filed on Aug. 24, 2020, which is incorporated by reference in its entirety.

FIELD OF THE DISCLOSURE

The present invention relates to a private toilet system for mounting on a truck type vehicle. In particular, the system herein relates to embodiments that allow for use of a toilet facility for persons driving a truck especially when driving in an area where toilet facilities are not available. Other systems described herein relate to a private toilet system device for a trailer that can be connected to another vehicle.

BACKGROUND

Toilets are one of the most basic needs of human beings. This basic need can be especially challenging in the trucking industry and among one of the biggest hurdles truck drivers face. America's trucking industry is the life blood of the U.S economy where nearly 71% of all freight tonnage moves on the backs of these trucks. Moving this much tonnage requires more than 3.6 million heavy duty trucks and over 3.6 million professional truck drivers. Truck drivers are constantly having to deal with deadlines and delays. Delays can be caused by accidents, congestion due to rush hour, road construction, and bad weather. These stressors can cause the truck drivers to stay behind the wheel for hours and continue on the road to their destination in order to make a deadline. Because these deadlines are tight, staying on the road becomes important and bathroom breaks become difficult.

Truck drivers spend a vast amount of time on the road and at any given time, the personal hygiene and health of these truck drivers is of utmost importance. Though there is a large network of truck stops and rest areas in the United States, the cleanliness and the availability of the toilets at the right time is a significant problem faced by the truck drivers on a regular basis compounded with the other challenges they face. Most often, truck drivers have to wait for long hours at the shipping and delivery facilities with no available restrooms. When there are available facilities, the toilets are frequently unclean and thus unhygienic. With such a basic need of a truck driver unmet where one is required to desist from relieving themselves for a long period of time, physical and health problems arise.

There are some solutions to these problems which may include aftermarket truck toilet devices equipped to trucks in a variety of manners. Some configurations may include a location within the cabin of the truck, toilets that are deployable from a truck, a generally deployable bathroom unit that may be utilized in trucking, and a toilet integrated into the design of a seat. There are a variety of aftermarket truck toilet designs currently available. While most designs operate with toilet functionality, there are often drawbacks such as locations within the cab rendering foul smells present to the occupants, reduced internal cabin space to accommodate internally located designs, and a lack of secured privacy from other team members within the truck when in use.

As noted above, it is important that drivers have a means of relief available at any time that the need may present itself, which is clean, private, and hygienic. Existing devices and systems for providing such a basic amenity are unable to fully provide such features.

Accordingly, there is still an unsolved need for a toilet facility technology that may address these and other existing issues.

SUMMARY

According to one embodiment, one or more embodiments are provided below for a toilet system adapted to be mounted to an exterior of a large truck, such as a semi-truck. The toilet system may be mounted on the back of a large truck, such as between a cab and a fifth wheel of a semi-truck. The present disclosure provides a toilet system that is conveniently located for use by a driver of a semi-truck and ensures the privacy, health, and hygiene of the driver. The toilet system may include a fully enclosed compartment having a platform and one or more doors that surround and fully close off an interior of the toilet system.

According to the one embodiment, one or more doors open to the interior of the toilet system which is accessible to someone for toilet use. The toilet system is generally provided for use in an outdoor environment, and thus, the toilet system comprises of at least one or more curtain panels which may be used to provide privacy to a person using the toilet system.

The interior of the toilet system may comprise of a toilet which is operatively connected to a water tank and a waste tank, whereby the water tank supplies clean water to flush the toilet, and the waste tank collects the flushed waste from the toilet. The toilet may be of a type that is fully functional such that the toilet has a fill, flush, or rinse capability. The clean water tank and the waste tank may each be equipped with a temperature control unit which includes a temperature sensor, a heating element, and a cooling system to monitor and regulate the temperatures of the clean water and the waste removed from the toilet. Each of the toilet, clean water tank, and the waste tank functions are electronically controlled via an electronic control assembly which is an electronic interface receiving and interpreting data from the various functions of the toilet system.

The interior of the toilet system also comprises of a storage enclosure and a fixed enclosure which are provided in line with the toilet and may conveniently form a bench. The storage enclosure is provided to store items that may be needed in the toilet system, and the fixed enclosure is provided to store a battery to power any electronics that may comprise the toilet system.

In an alternate embodiment, one or more embodiments are provided that describe a toilet system that also comprises of a fully enclosed compartment having a platform and one or more doors that surround and fully close off an interior of the toilet system. The one or more doors open to the interior of the toilet system which is accessible to someone for toilet use. The interior of the toilet system may comprise of a toilet which is operatively connected to a water tank and a waste tank. The toilet may be of a type that is fully functional such that the toilet has a fill, flush, or rinse capability. The clean water tank and the waste tank may each be equipped with a temperature control unit which includes a temperature sensor, a heating element, and a cooling system to monitor and regulate the temperatures of the clean water and the waste removed from the toilet. Each of the toilet, clean water tank, and the waste tank functions are electronically controlled via an electronic control assembly which is an electronic interface receiving and interpreting data from the various functions of the toilet system. The toilet system may further be comprised of shower area which comprises of a showerhead, a divider door, a shower water tank, and a shower drain. The shower tank is mounted to a top of the enclosed compartment such that the water is gravity fed from the shower water tank and into the showerhead. The toilet system described in the one or more embodiments of the alternate embodiment may be mounted to a trailer which is hitched to a vehicle and towed which may be beneficial for camping purposes or when away from any facilities for a period.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
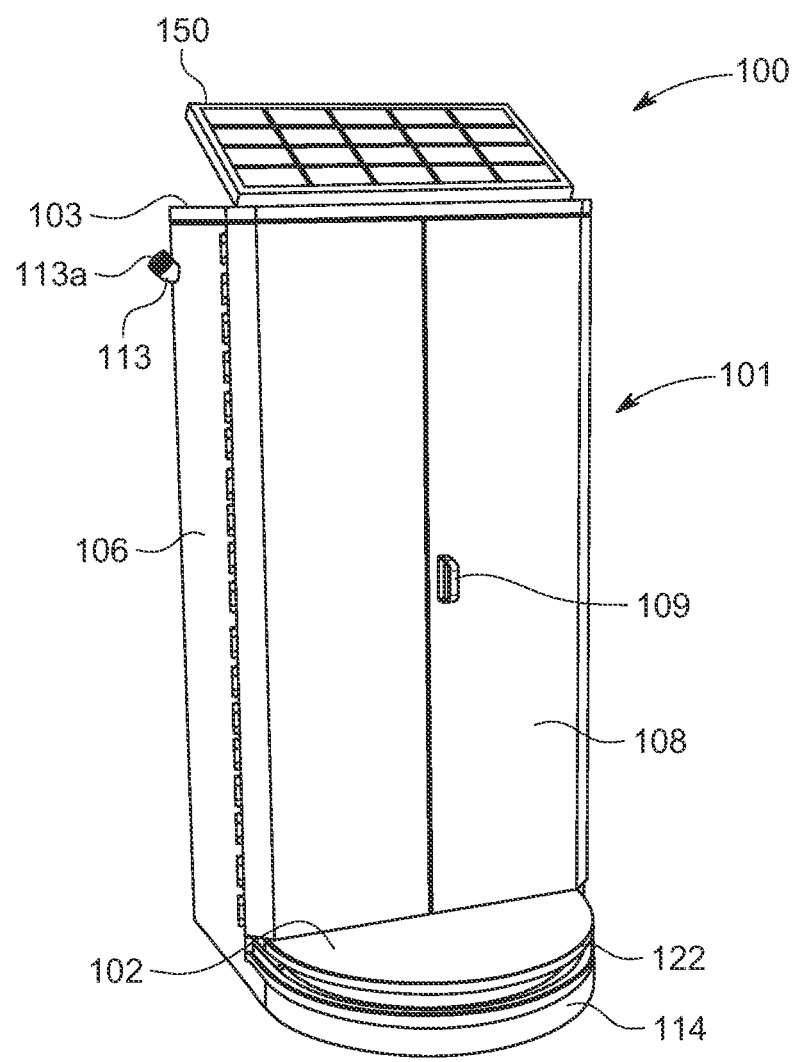
FIG. 1 is a pictorial illustration of a left perspective view of a toilet system in accordance with an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

The present disclosure is generally drawn to various embodiments for an independent toilet system that makes it possible to be adapted to be mounted to any large truck, and in particular to a semi-truck. In particular, the one or more non-limiting embodiments for a toilet system enables a large truck to be fitted with the toilet system after market. The toilet system is sized to fit on an exterior of a large truck between the cab and the fifth wheel. Additionally, the toilet system may be securely attached to the large truck with a clamping hardware that would secure and position the toilet system without drilling or welding to the semi-truck. This is advantageous because installing the toilet system to the large truck in such a manner will not compromise the structural integrity of the large truck frame itself. Additionally, the attachment means permits the toilet system to be a removable feature such that the toilet system is not permanently installed and may be removed when needed, again without any damage to the large truck.

In addition to the use of an independent toilet system with a semi-truck, it would be desirable to have the same system available to those who may travel on the road. For example, it may be beneficial for a camping trip to provide a private and fully functional toilet for use. In particular, a toilet system would be provided on a trailer which may be directly manufactured onto the trailer or be mounted onto the trailer wherein the trailer is connected to a hitch of any vehicle and towed.

Accordingly, the one or more non-limiting embodiments provided below describe a toilet system that may be mounted onto a large truck. The embodiments provided herein may be used for multiple vehicle types, wherein a toilet system may be provided on a trailer to be hitched to a vehicle. Further details are provided below with reference to the Figures. It is also to be understood that because the toilet system described in the present disclosure is an independent system which may function on its own, the toilet system may be used anywhere independent of any vehicle.

Figure 6:
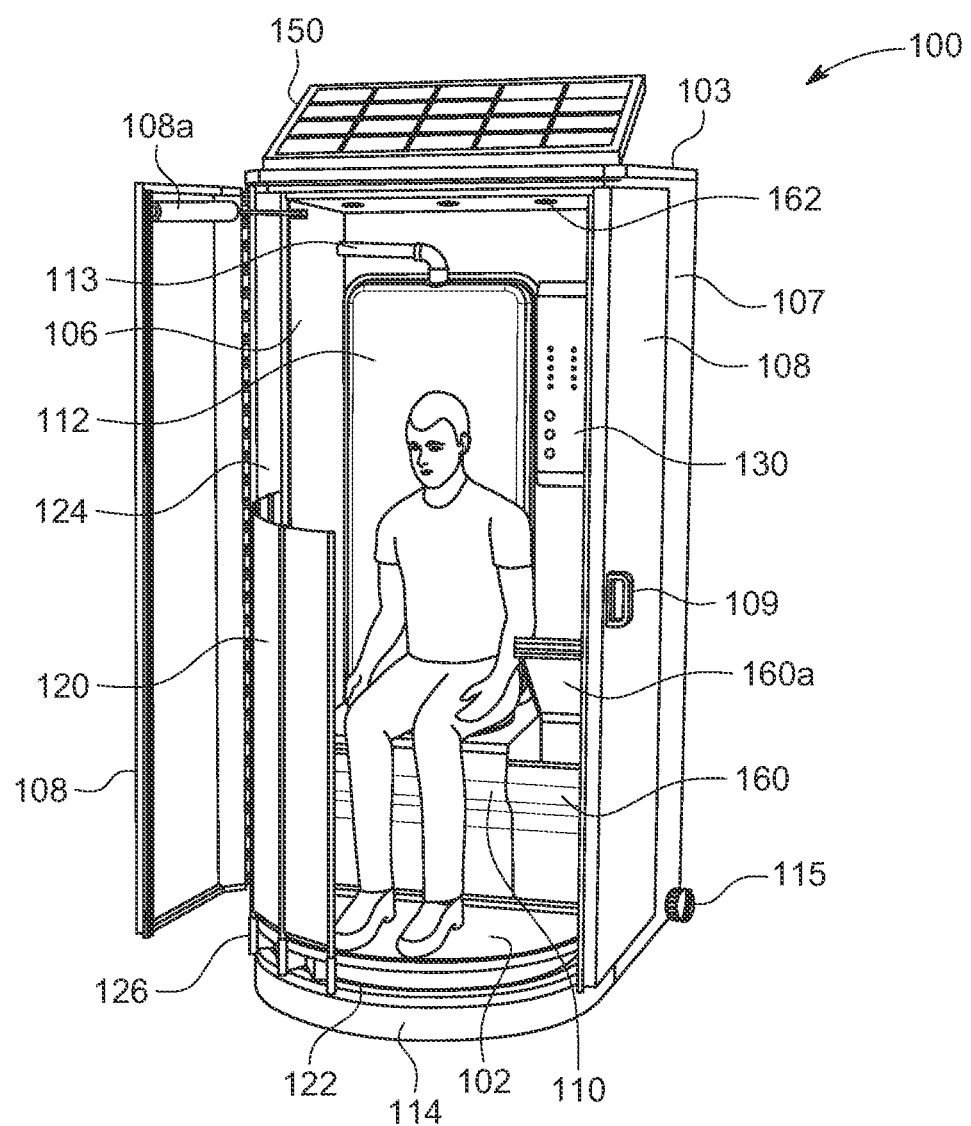
FIG. 6 is a pictorial illustration of a right perspective view of a user within an interior of a toilet system with a partially open curtain panel in accordance with an illustrative embodiment.
Figure 7:
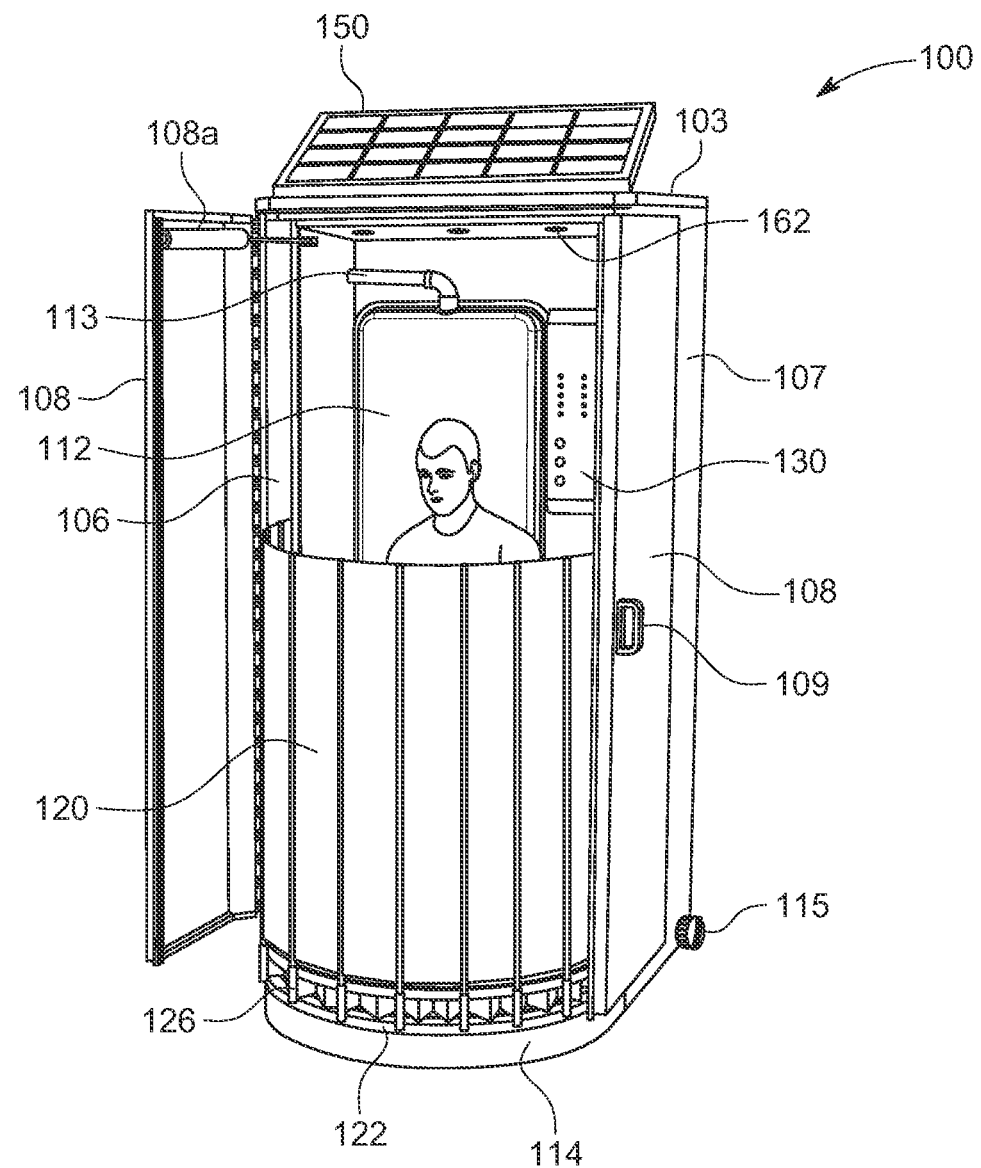
FIG. 7 is a pictorial illustration of a right perspective view of a user within an interior of a toilet system with a fully closed curtain panel in accordance with an illustrative embodiment.
Figure 8:
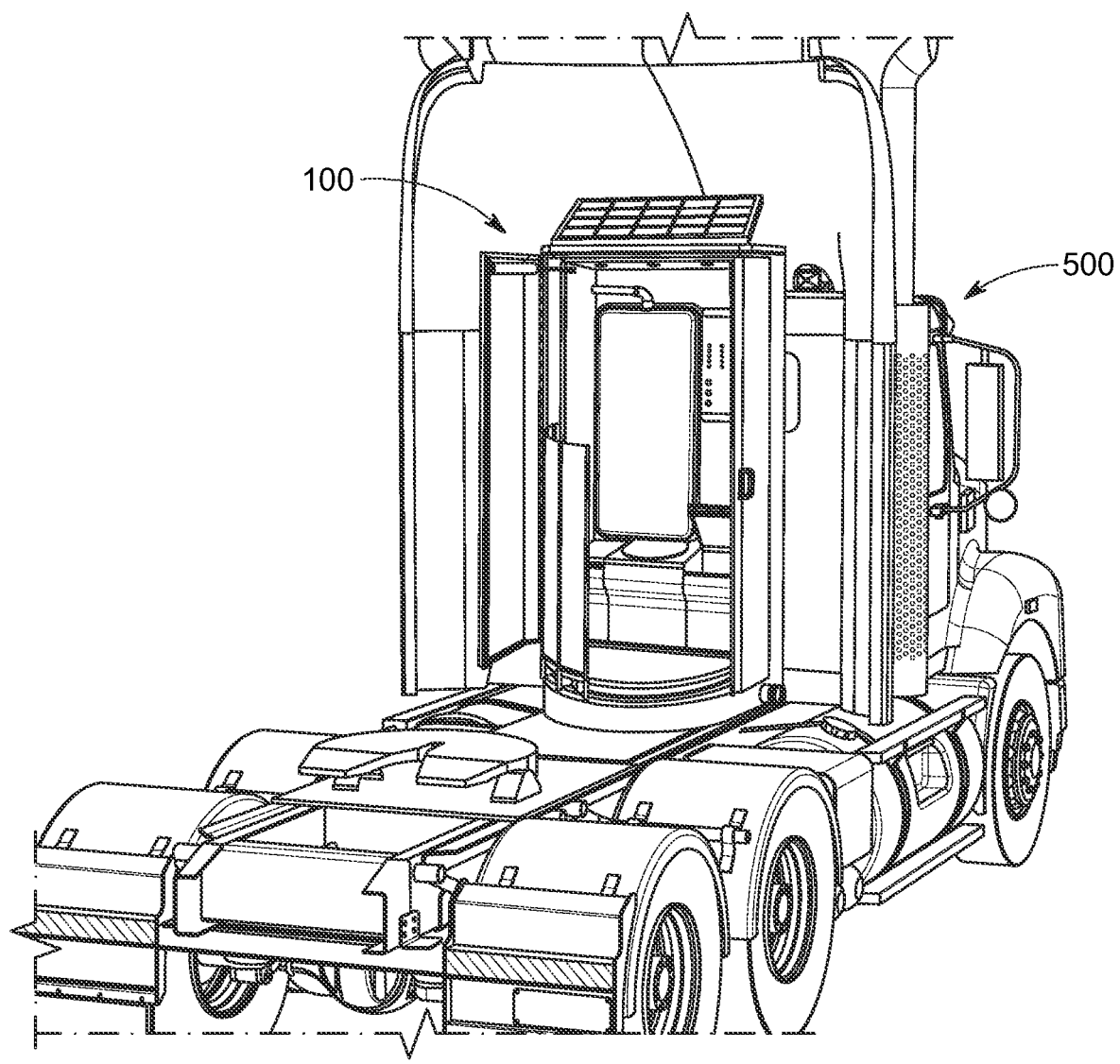
FIG. 8 is pictorial illustration of a toilet system mounted to an exterior of a large truck.

Turning to the Figures, FIGS. 1 to 8 are illustrations depicting a toilet system 100 which is an example of an independent system for readily providing a private enclosed structure to be used for meeting toilet needs, for example, mounted to an exterior of a large truck and used by a truck driver while on the road. FIG. 8 illustrates one such toilet system 100 mounted to an exterior of a large truck 500. In one or more non-limiting embodiments, the toilet system 100 comprises of a fully enclosed compartment 101 having one or more doors 108 that allow access to an interior of the enclosed compartment 101. The toilet system 100 also comprises of a toilet 110 operatively connected to a clean water tank 112 and a waste tank 114. The toilet system 100 further comprises of a curtain panel 120, movable along a guide channel 122, and stored within a storage channel 124. The toilet system 100 may also comprise of an electronic display panel 130 which monitors and controls several electrical features integrated into the toilet system 100. In order to supply power to the electronic display panel 130 and control the several electrical features, a solar panel 150 may also comprise the toilet system. Additional features, such as a storage enclosure 160, lighting 162, a toilet paper holder 164, and a fixed enclosure 170 for containing a battery (not shown) and other electronics (not shown) may also comprise the toilet system 100.

Figure 2:
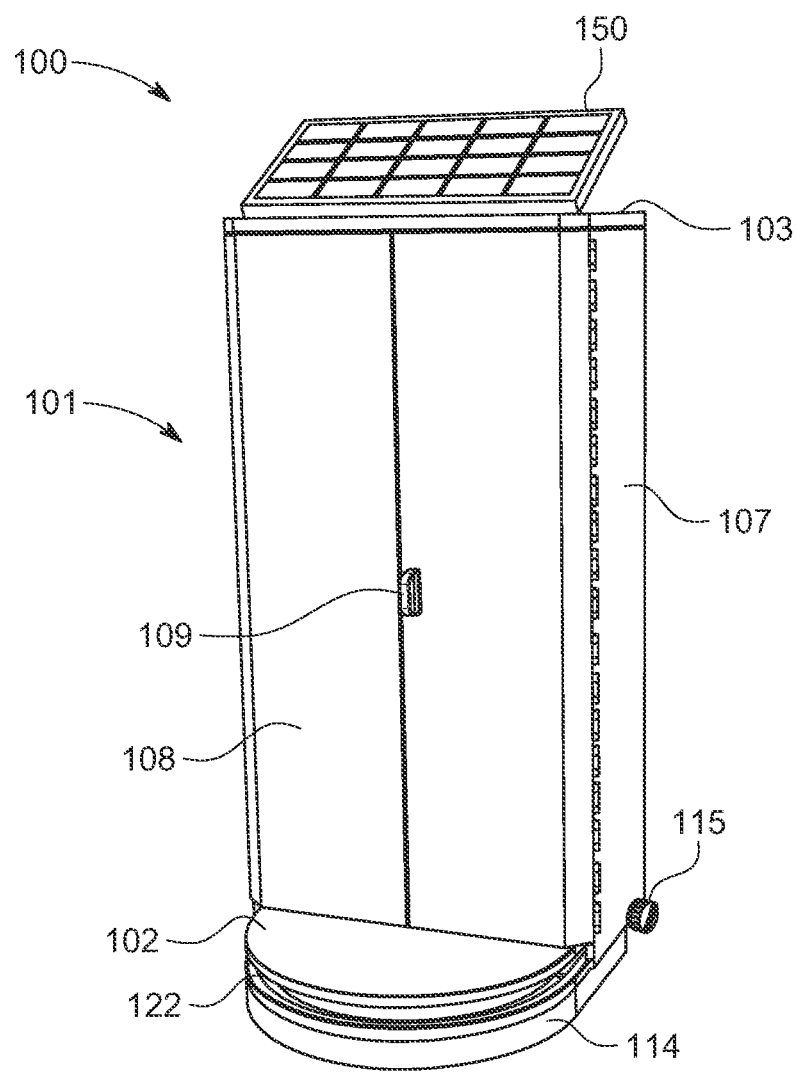
FIG. 2 is a pictorial illustration of a right perspective view of a toilet system in accordance with an illustrative embodiment.

With reference to FIGS. 1 and 2, an exterior of the toilet system 100 is shown with the one or more doors 108 of the enclosed compartment 101 closed. More specifically, the enclosed compartment 101 is shown to comprise of a platform 102, a roof 103, a back wall 105 (see, FIGS. 3 and 4), a left side wall 106, a right side wall 107, and the one or more doors 108. In the figures, the one or more doors 108 are shown to be comprised of two doors which may be hingedly connected to the left side wall 106 and the right side wall 107, and which open to allow access to the interior of the enclosed compartment 101. In this configuration, the two doors 108 are provided with a handle 109 which may be gripped to open or close the doors 108. The handle 109 may be of a type that locks. Consequently, the toilet system 100 may be used by a person with a means to unlock the two or more doors or by someone else with permission of the person with the means to unlock. The handle 109 with the lock also ensures that the one or more doors 108 remain closed while a vehicle that the toilet system 100 is mounted to is moving.

The one or more doors 108 may also include a mechanical door closing device which is responsible for ensuring that the one or more doors 108 are closed properly and in a controlled manner without slamming. In the FIGS. 3 to 7, the mechanical door closing device is depicted as a hydraulic door closer 108a which is installed on both doors 108. It is to be understood that other mechanical door closing devices that close doors in a controlled manner may also be used. It is also to be understood that the one or more doors 108 may be provided without a mechanical door closing device.

As seen in the Figures, the platform 102 provides a base onto which most of the components comprising the toilet system 100 are configured or integrated onto. The platform 102 confers another advantage where the toilet system may be an independent unit capable of being placed anywhere and function independent of any other structural feature not part of the toilet system 100. The platform 102 is designed such that a portion of it extends past the one or more doors 108 when in a closed position. In one or more non-limiting embodiments, the platform 102 may be fashioned from a strong material such as a metal and configured in a two-dimensional shape wherein the portion that extends past the closed one or more doors 108 is in a shape of a semi-circle.

When the one or more doors 108 are open, the interior of the toilet system 100 is accessible to someone for toilet use. The toilet system 100 is generally provided for use in an outdoor environment, for example, mounted to an exterior of a semi-truck. Thus, the toilet system 100 comprises of at least one curtain panel 120 which may be used to provide privacy to a person using the toilet system 100. In the non-limiting embodiment shown in FIGS. 3-7, a pair of curtain panels 120 comprise the toilet system 100 to confer privacy during use. In this configuration, the pair of curtain panels 120 may be provided with one on each of the left side wall 106 and the right side wall 107 such that the curtain panels 120 may be pulled toward a front of the toilet system 100 to provide adequate privacy. It is to be understood that one curtain panel 120 may also comprise the toilet system 100, wherein the one curtain panel may be provided on either a left side wall 106 or a right side wall 107 and capable of being pulled fully from one side to the other. The one or more curtain panels 120 may be of a height that provides adequate privacy during toilet use. As best seen in FIGS. 6 and 7, the one or more curtains 120 are shown to have a height which is relatively half of a height of the enclosed compartment 101. It is to be understood that the height of the one or more curtains 120 may be relatively equal to the height of the enclosed compartment 101.

In the one or more non-limiting embodiments shown in FIGS. 3-7, the pair of curtain panels 120 are integrated onto the guide channel 122 which is configured onto the platform 102. The guide channel 122 is shown to be integrated along a perimeter of a bottom surface of the platform 102. The pair of curtain panels 120 are fashioned with any suitable material which is weather resistant and wear and tear resistant, including and not limited to durable fabric material, plastic, or metal or a combination of materials. The curtain panels 120 may be configured such that the curtain panels 120 are adjoined to a rail system 126 to allow the curtain panels 120 to slide open and closed in an accordion like motion. The rail system 126 is integrated into the guide channel 122 which facilitates the sliding movement between the open position and the closed position. It is to be understood that the curtain panel may be constructed in any suitable configuration to slide along the guide rail 122 to open and close.

In one or more non-limiting embodiments, the curtain panel 120 is stored within the storage channel 124 when not in use. As clearly seen in FIGS. 3 and 4, the storage channel 124 is provided along each of the left side wall 106 and the right side wall 107 such that the curtain panels 120 may be stored within their respective storage channels 124 when not in use and when the one or more doors 108 are moved to the closed position. The storage channel 124 may be described as a vertically extending gutter along the left side wall 106 and the right side wall 107. The benefits of the storage channel 124 not only include a means to store the curtain panel 120 when not in use but may also include protecting and securing the curtain panel 120 when in a closed position.

Figure 3:
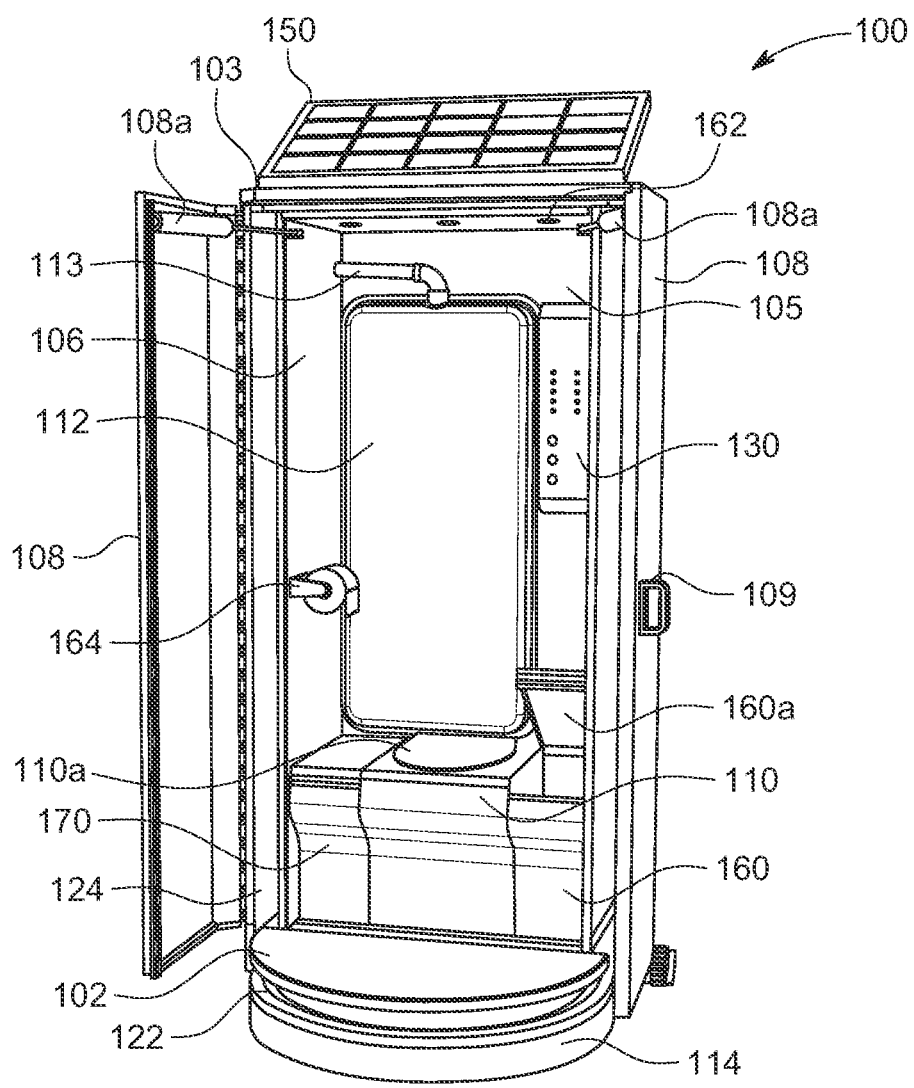
FIG. 3 is a pictorial illustration of a right perspective view of an interior of a toilet system in accordance with an illustrative embodiment.
Figure 4:
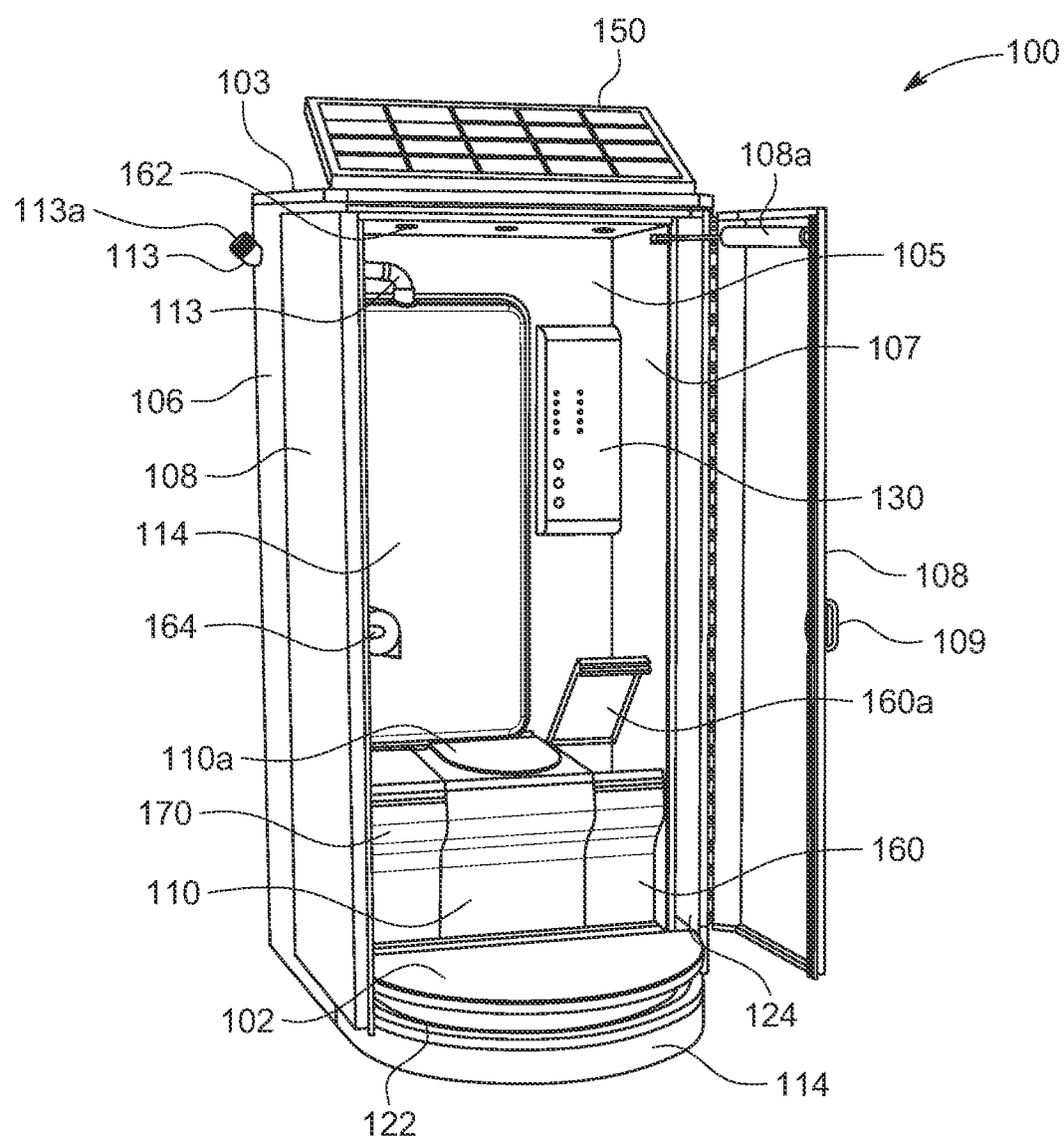
FIG. 4 is a pictorial illustration of a left perspective view of an interior of a toilet system in accordance with an illustrative embodiment.
Figure 5:
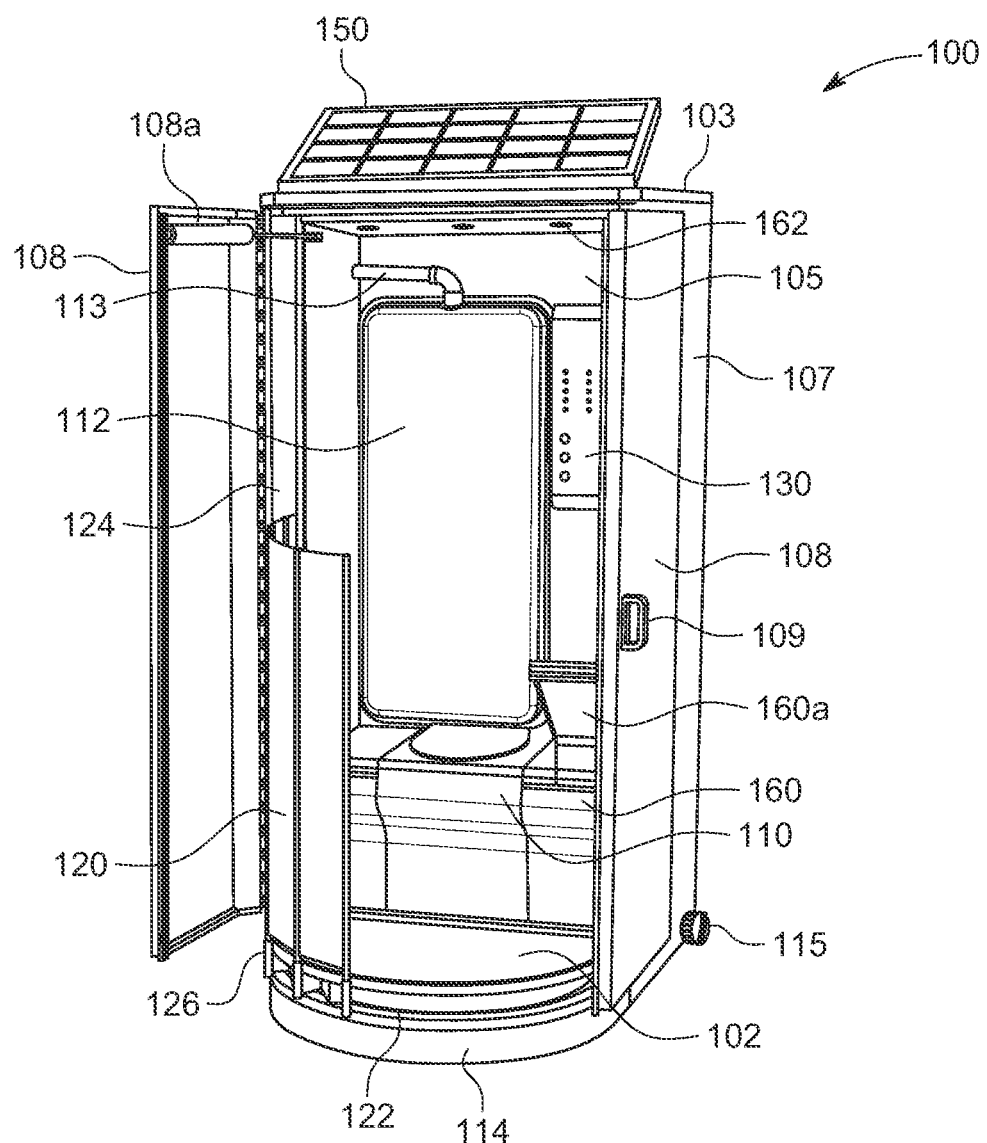
FIG. 5 is a pictorial illustration of a right perspective view of an interior of a toilet system with a curtain panel open in accordance with an illustrative embodiment.

With reference to FIGS. 3 and 4, the interior of the toilet system 100 is shown. As can be seen, the interior of the toilet system 100 comprises of the toilet 110 arranged between the storage enclosure 160 and the fixed enclosure 170. The storage enclosure 160 may be provided with a hinged lid 160a, wherein items may be stored within the storage enclosure and may be accessed by opening the hinged lid. In the illustrated form, the toilet 110, storage enclosure 160, and the fixed enclosure 170 are in line and arranged relatively evenly with each other such that they conveniently form a bench, however, may also take any convenient form. The toilet 110, the storage enclosure 160, and the fixed enclosure 170 are configured onto the platform 102. In a preferred form, the toilet 110 is of a type that is fully functional such that the toilet 110 has a fill, flush, or rinse capability. The toilet 110 may also include a bidet feature (not shown). It is to be understood that alternatively any form of toilet may be used, including and not limited to a non-flushing kind and/or not provided with a bidet feature. Any functions of the toilet 110 may be controlled electronically via the electronic control assembly 130 (discussed below) or alternatively may have manual function capabilities such as a manual flush. Advantages of the toilet system 100 comprising a functional toilet 110 with flushing capability include, but are not limited by, inner sides of the toilet being cleansed with each flush, flushing or removing waste and sending it into the waste tank, and further reduction in odor.

The toilet 110 may include a lid 110a that can be placed over an opening in the toilet 110 and simultaneously provide a convenient bench with the hinged lid 160a of the storage enclosure 160 and the fixed enclosure 170. In a preferred non-limiting embodiment, the toilet 110 comprises of a heated seat. The benefit of the heated seat being that because the toilet system 100 is placed in an outside environment the toilet system is exposed to varying temperatures, and thus in cold temperatures the seat of the toilet 110 may be heated prior to use. It is also to be understood that in alternate embodiments, the toilet 110 may be comprised of a seat that is not electrically heated.

In one or more non-limiting embodiments illustrated in FIGS. 3 to 7, the toilet 110 is operatively connected to the clean water tank 112 and the waste tank 114. One or more electrically controlled valves (not shown) ensure the toilet 110 functions properly where the flow of water in from the clean water tank 112 and out to the waste tank is controlled appropriately.

The clean water tank 112 and the waste tank 114 may each be equipped with a temperature control unit (not shown) which is electronically controlled via the electronic control assembly 130 (discussed below). The temperature control unit includes a temperature sensor, a heating element, and a cooling system which are contained within the clean water tank 112 and the waste tank 114 to regulate the temperatures of the clean water and the waste removed from the toilet 110, respectively. Regulating the temperature of the clean water and the waste stored in their respective tanks serves several purposes including and not limited to preventing freezing in cold weather, preventing heating in warm weather, maintaining odor control, ensuring system integrity, and other issues related to extreme or fluctuating temperatures.

The clean water tank 112 and the waste tank 114 may each be equipped with a level sensor (not shown) which provides for a means to easily determine the level of clean water and waste in their respective tanks. The level sensors help visually identify when the clean water tank 112 may need to be refilled and the waste tank 114 may need to be emptied. In one or more non-limiting embodiments, the level sensors may be provided within each of the clean water tank 112 and the waste tank 114 and a level of each tank may be indicated on the electronic display panel 130 (discussed below). For example, the electronic control assembly 130 may include a sequence of LED lights which indicate the level of clean water or waste by a number of LEDs lit up for each. In alternate embodiments, the level sensors may be provided within each of the clean water tank 112 and the waste tank 114 and a level of each tank may be indicated on the respective tanks. For example, similar to the above example, the clean water tank 112 and the waste tank 114 may each be configured with a sequence of LED lights which indicate the level of clean water or waste in their respective tanks by the number of LEDs lit up. In a further embodiment, the level of clean water and waste within the clean water tank 112 and the waste tank 114, respectively, may be visually determined by providing a view into each of the tanks through a clear section on each of the clean water tank 112 and the waste tank 114.

The clean water tank 112 may be of a size that can fit within the interior of the toilet system 100. In one or more embodiments, the clean water tank 112 may be within the non-limiting range of six to ten gallons. As illustrated in the figures, the clean water tank 110 is located within the interior of the toilet system 100 and connected to the back wall 105 of the enclosed compartment 101 relatively close to the toilet 110. It is also to be understood that alternatively the clean water tank 112 may be configured into the back wall 105 of the enclosed compartment 101 such that the clean water tank 110 is a part of the back wall 105. The clean water tank 112 is filled with clean water through a fill tube 113 which extends from the clean water tank 112 and exits out through the left side wall 106 and wherein a cap 113a closes an end of the fill tube 113 that sits outside of the enclosed compartment 101. To fill, the cap 113a may be removed and the clean water tank 112 may be filled by any means, such as placing a water hose into the fill tube 113 which is connected to the clean water tank 112. Once filled, the water hose may be removed and the cap 113a replaced onto the end of the fill tube 113 that sits outside of the enclosed compartment 101.

The waste tank 114 is provided as a storage tank to collect any waste that is flushed from the toilet 110 and may be provided on a bottom surface of the platform 102. In one or more non-limiting embodiments, the waste tank 114 may be configured onto the bottom surface of the platform 102 and having a capacity of ten to fourteen gallons. A drain 115 may be configured onto the waste tank 114 to provide a means to empty and clean the waste tank 114. As shown in the figures, the drain may be configured onto a side of the waste tank 114 for easy access. The waste tank 114 may be configured in a similar shape to the platform 102 such as to provide a seamless appearance. An interior of the waste tank 114 may be configured with the interior of the waste tank 114 angled toward the drain 115 such that the waste collecting in the waste tank 114 gravitationally moves toward the drain 115. The waste tank 114 is emptied in a similar fashion to a recreation vehicle (RV) waste tank wherein a drain hose (not shown) is attached to the drain 115 on the toilet system and the waste tank is allowed to drain through the drain hose at an appropriate sewer line or dumping station. The waste tank 114 may be rinsed clean and drained.

As mentioned earlier, additional features may also comprise the toilet system 100 including and not limited to the solar panel 150, the storage enclosure 160, the fixed enclosure 170, the lighting 162, and the toilet paper holder 164. The solar panel 150 may be provided on an outside of the enclosed compartment 101, and preferably mounted to the roof 103 with an adjustable mount (not shown) such that a tilt of the solar panel 150 may be adjusted to maximize exposure to the sun. The solar panel 150 provides an option for charging the batteries when a vehicle's power is not available.

The fixed enclosure 170 is provided to contain the battery that powers any electronics comprising part of the toilet system 100. For example, in one or more non-limiting embodiments, the toilet 110 may be flushed electronically through the electronic control assembly 130 which contains most of the control features of the toilet 110. In this configuration, the toilet system 100 may be powered by the battery stored in the fixed enclosure 170. Further, any electronics may also be stored in the fixed enclosure 170. The lighting 162 is configured on the interior of the enclosed compartment 102 to provide light when need for using the toilet system. In the one or more non-limiting embodiments shown in FIGS. 3 to 7, the lighting 162 may be configured as an overhead lighting wherein the lighting 162 is installed on an interior facing side of the roof 103 of the enclosed compartment 101. The lighting 162 may be controlled through the electronic control assembly 130 or alternatively may be controlled through a manual switch (not shown) or turned on when the one or more doors 108 of the enclosed compartment 102 are opened. The toilet paper holder 164 is configured on a left side wall 106 or alternatively on a right side wall 107 for holding a toilet paper roll for easy access. The storage enclosure 160 is provided to allow storage of items such as and not limited to cleaning supplies, toilet paper, and other toilet necessities.

In one or more non-limiting embodiments, the electronic control assembly 130 also comprises part of the toilet system 100 and provides an electronic means of controlling most all functions of the toilet system 100. In referring to FIG. 9, a block diagram depicts the electronic control assembly 130 and the other features comprising the toilet system 100 that the electronic control assembly 130 is in communication with. The electronic control assembly 130 is an interface to control the various functions of the toilet system 100 by receiving and interpreting data to monitor and perform the designated tasks for the following: the toilet 110; the lighting 162; the clean water tank 112; the waste tank 114; the solar panel 150; the battery in the fixed enclosure 170; an in-cab control/monitor assembly 180; and a door open sensor 139. It is to be understood that any other electronic assemblies beneficial to the toilet system 100 may be connected to the electronic display 130.

Figure 9:
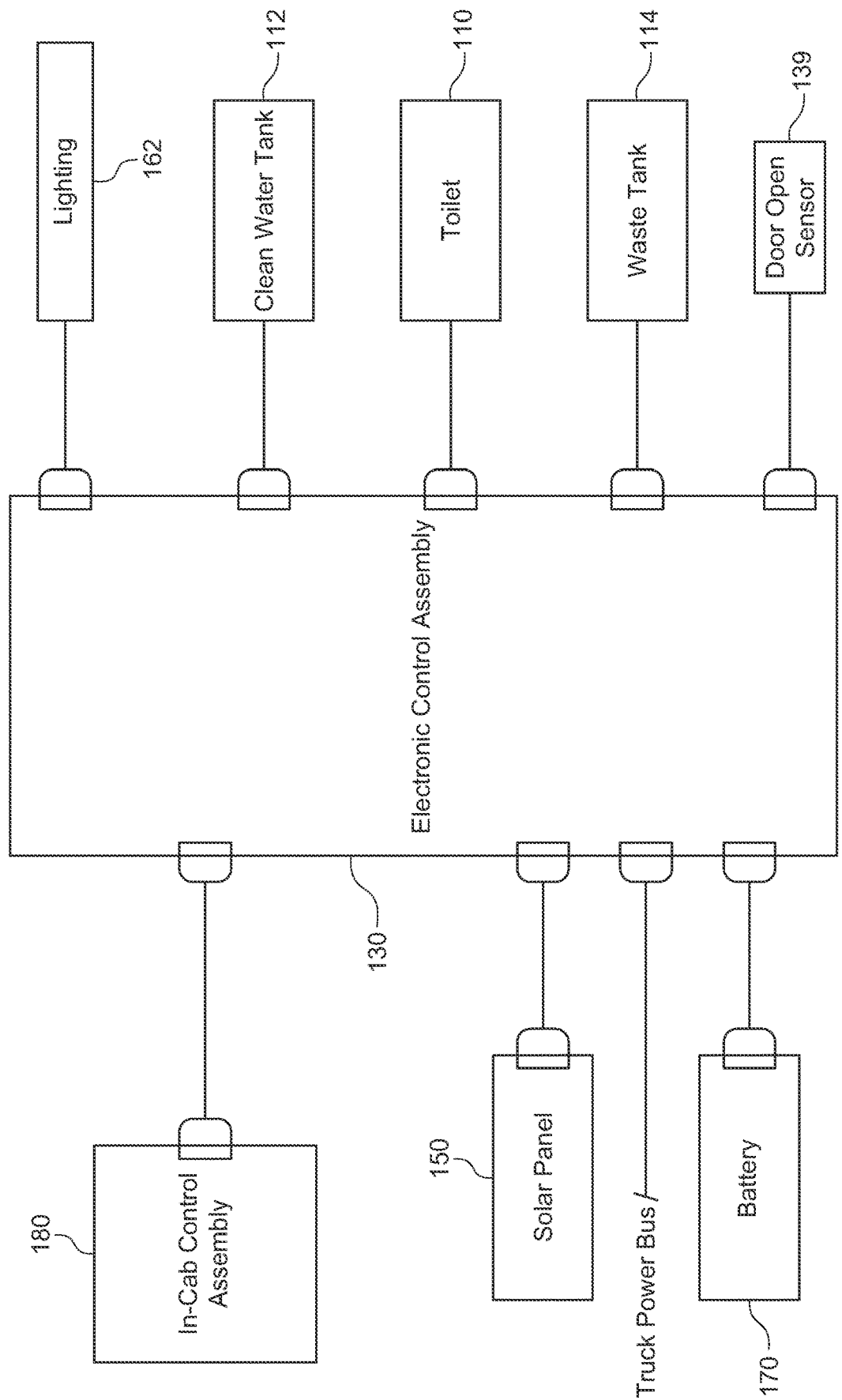
FIG. 9 is a simple block diagram of an electronic control assembly in accordance with an embodiment.
Figure 10:
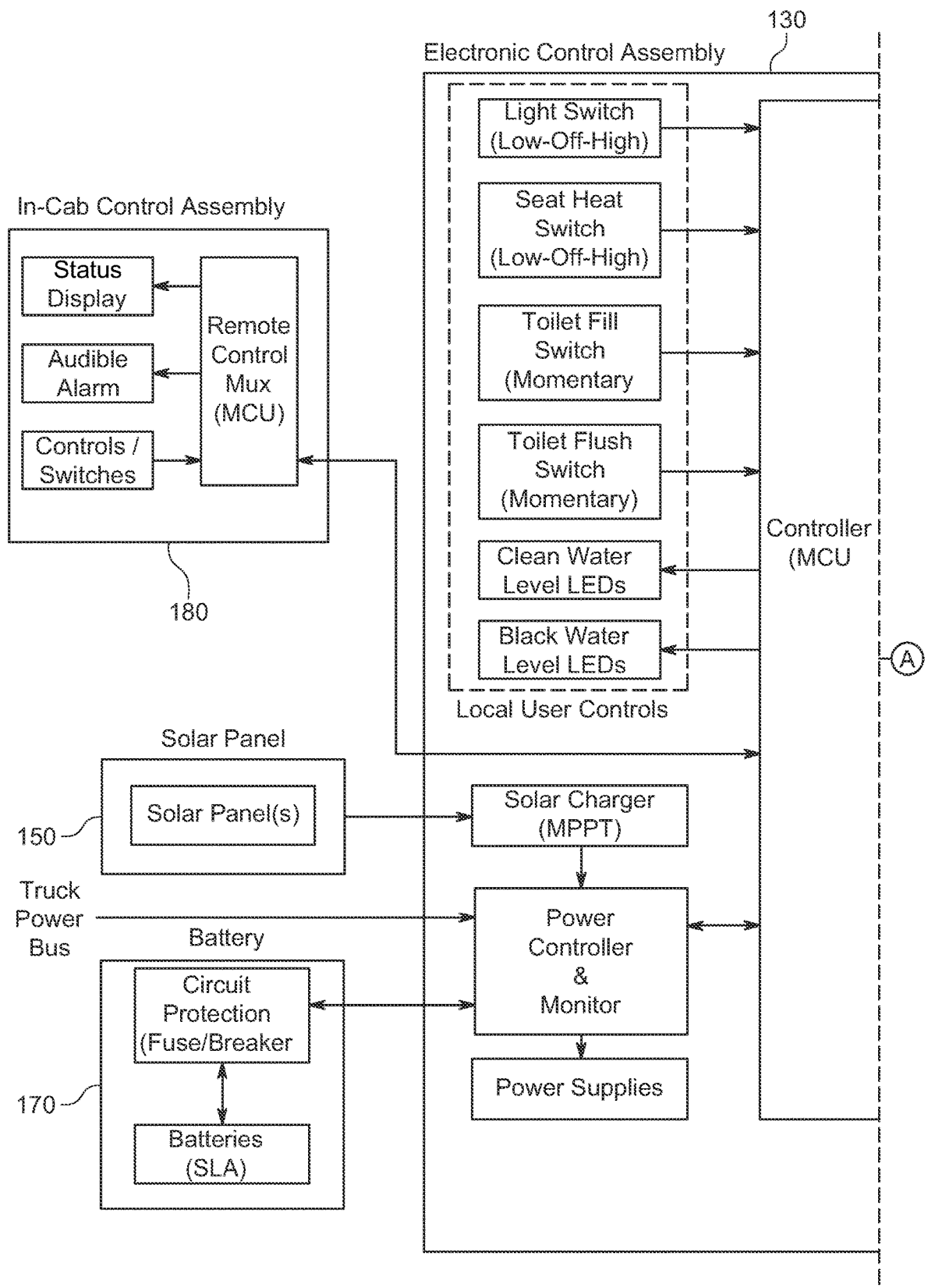
FIG. 10 is a detailed block diagram of an electronic control assembly in accordance with an embodiment.
Figure 10:
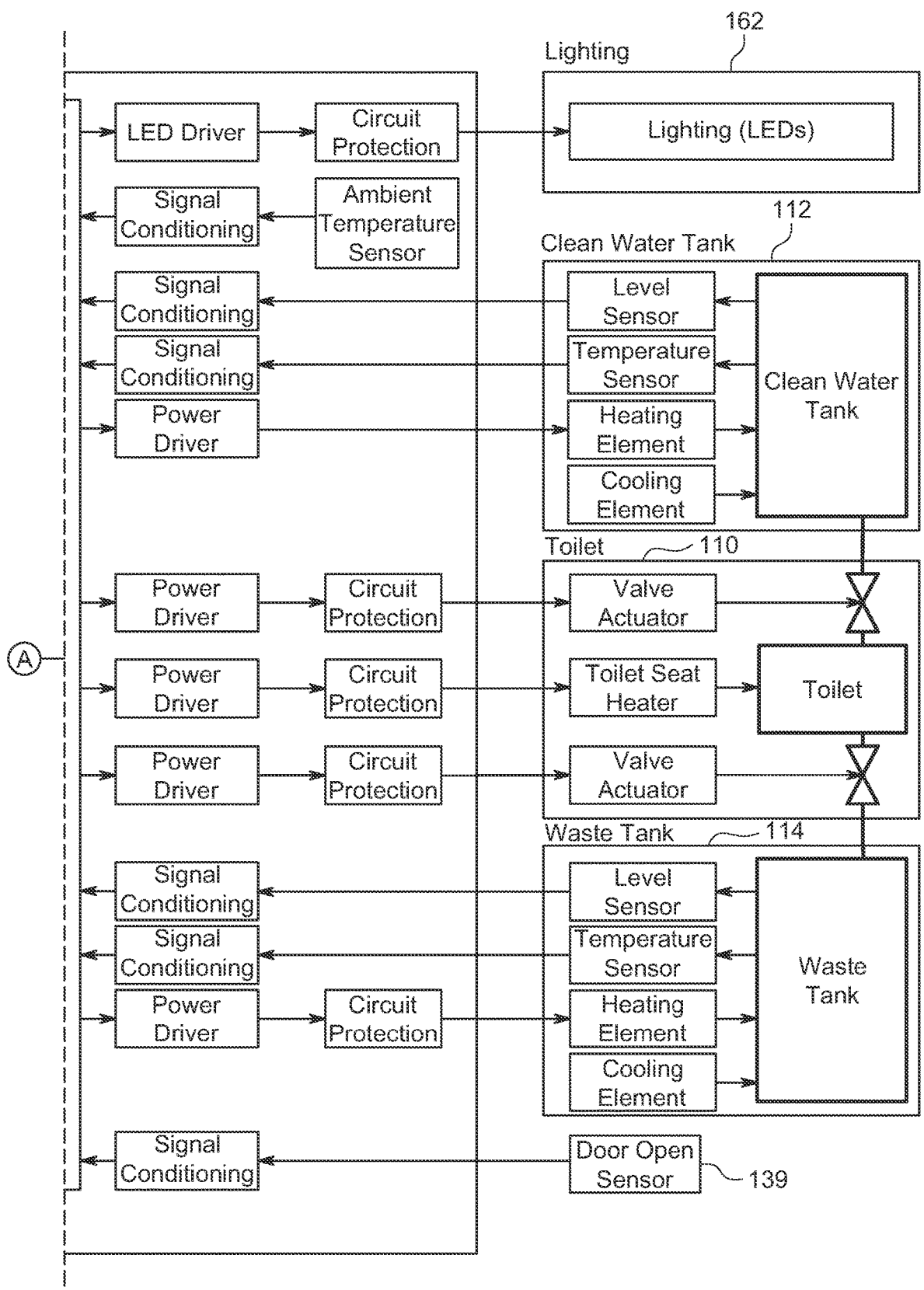

Referring to both FIGS. 9 and 10, each of the various features comprising the toilet system 100 and their respective tasks are depicted along with the electronic control assembly 130. The electronic control assembly 130 includes a microcontroller (MCU) and interfaces to all other functional features to support overall operation of the toilet system 100. The electronic control assembly 130 provides an interface which may contain a plurality of switches and a plurality of indicators which provide a local user interface on the interior of the enclosed compartment 101. As best seen in FIG. 10, some examples of the switches and the indicators include and are not limited to, a light switch to turn the lighting 162 on and off, a seat heat switch for the toilet 110, a toilet fill switch to fill the toilet 110 with water prior to use, a toilet flush switch to rinse and flush the toilet 110, a first series of LEDs specifically to indicate the level of water in the clean water tank 112, and a second series of LEDs specifically to indicate the level of waste accumulated in the waste tank 114.

The block diagrams in FIGS. 9 and 10 also show the in-cab control assembly 180 which is remotely connected to the electronic control assembly 130. The in-cab control assembly 180 is an interface panel provided for a driver of a vehicle and may be located inside a vehicle, such as a cab of a truck to which the toilet system 100 is mounted on. The in-cab control assembly 180 contains a status display to show a driver the status of the toilet system 100, such as and not limited to levels and temperatures in the clean water tank 112 and waste tank 114, the battery status, and other relevant indicators. The in-cab control/monitor assembly 180 may also contain switches which provide inputs to the electronic control assembly 130 for remote operation of the lighting 162, heating the seat of the toilet 110, adjusting the temperatures in the water tank 112 and the waste tank 114, and other relevant functions that can be controlled remotely. An alternative option for the in-cab control/monitor assembly 180 is to use an OLED or LCD type display with touch overlay instead of discrete indicators and switches. The advantage of the in-cab monitor assembly 180 is that it allows a driver to monitor some conditions of the toilet system 100 from within the vehicle rather than having to exit the vehicle and check the conditions. It may be beneficial in a situation where the vehicle is driving through an extreme weather condition, for example the temperature is either very hot or very cold, and with the in-cab monitor assembly 180, the driver may be alerted immediately that the temperatures in the clean water tank 112 or the waste tank 114 need to be addressed.

Referring to FIGS. 11 through 14, an alternate non-limiting embodiment of a toilet system is depicted and referred to as toilet system 200. The toilet system 200 is designed to be used on a trailer 600 wherein the trailer 600 is hitched to a back of a vehicle. The toilet system 200 may be a useful addition for vehicles with limited living facilities where people can camp or have to stay away from toilet and shower amenities for a period of time. The toilet system 200 is designed to be directly installed on a trailer during manufacturing or alternatively may be installed post manufacturing. It is also to be understood that the toilet system 200 is an independent system and may be used anywhere without mounting to a trailer or another vehicle.

In this non-limiting embodiment, the toilet system 200 is comprised of most of the same features as the toilet system 100 discussed above. The toilet system 200 comprises of a fully enclosed compartment 201 having one or more doors 208 with a handle 209 that allows access to an interior of the enclosed compartment 201. The toilet system 200 also comprises of a toilet 210 operatively connected to a clean water tank 212 and a waste tank 214. The toilet system 200 further comprises of a curtain panel 220, movable along a guide channel 222, and stored within a storage channel 224. The toilet system 200 may also comprise of an electronic display panel (not shown) which monitors and controls several electrical features integrated into the toilet system 200. The electronic display panel is the same as and functions exactly the same as the electronic control assembly 130 in the toilet system 100 described above in FIGS. 9 and 10. The toilet system 200 also comprises of lighting (not shown), a toilet paper holder 264, and a fixed enclosure (not shown) for containing a battery (not shown) and other electronics (not shown). In this non-limiting embodiment, the toilet system 200 additionally comprises of a shower area 290 which includes a divider wall 291, a fold down seat 292, a showerhead 293, a shower water tank 294, and a shower drain 295.

Figure 11:
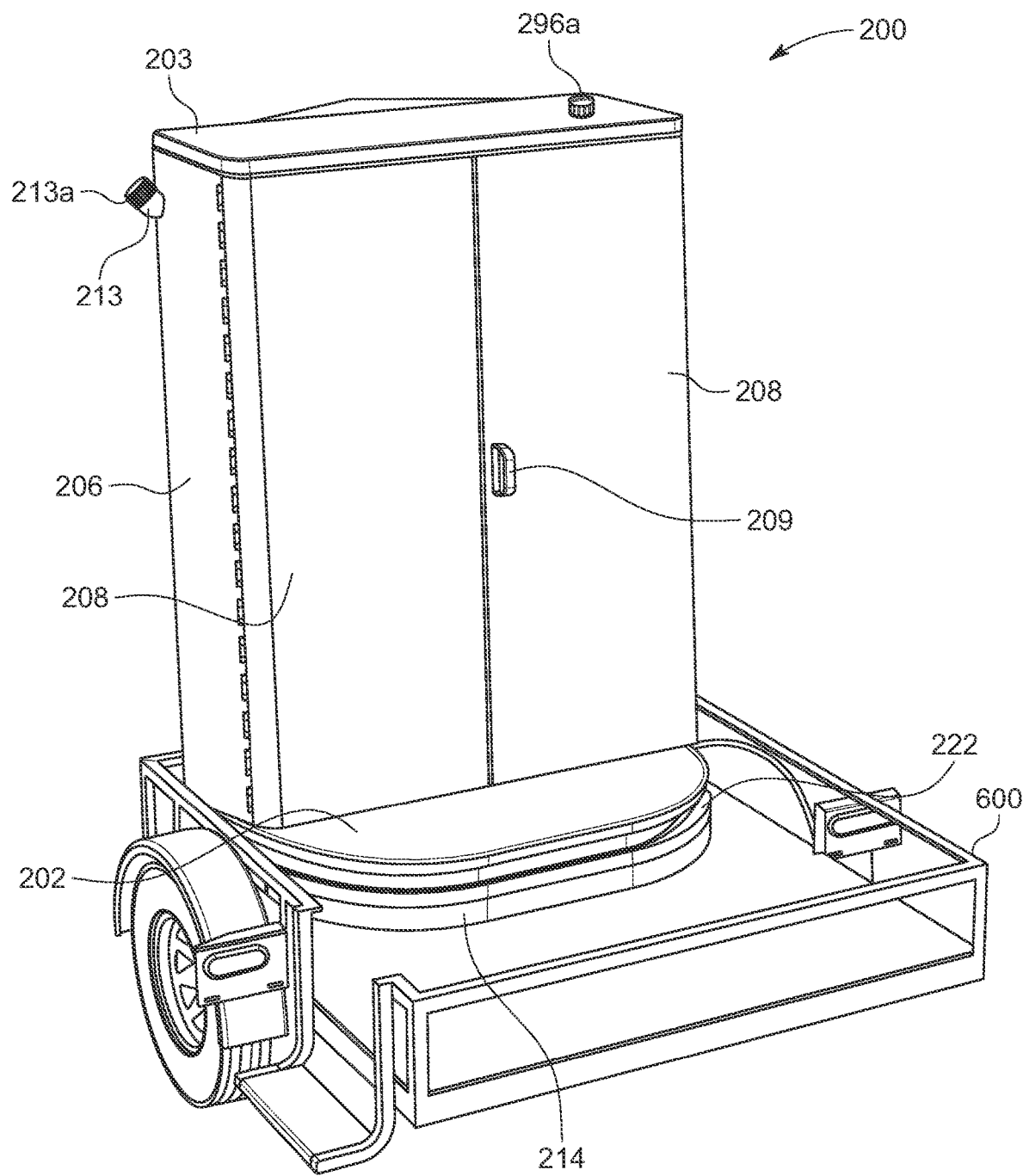
FIG. 11 is a pictorial illustration of a left perspective view of a trailer toilet system in accordance with an illustrative embodiment.
Figure 12:
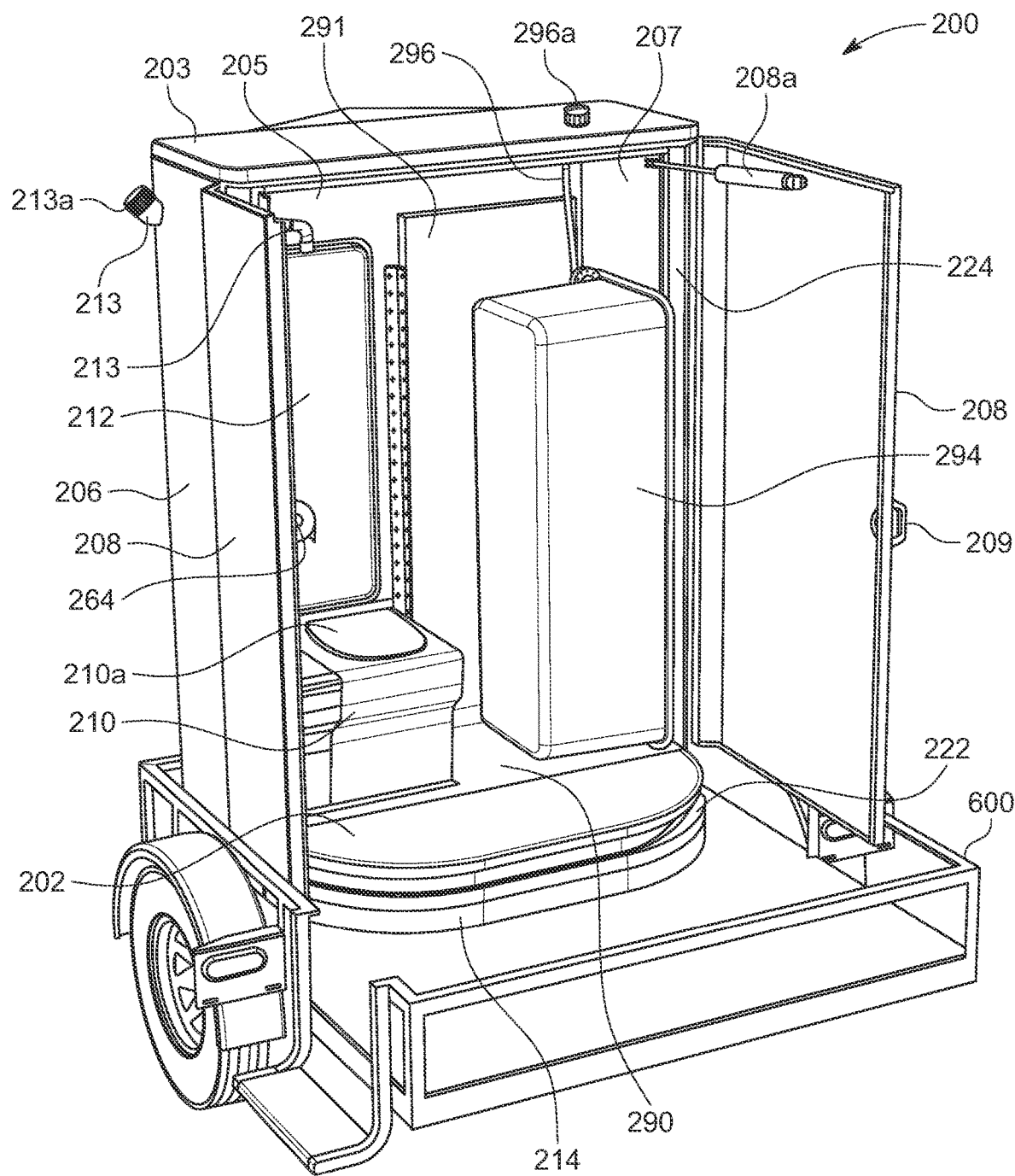
FIG. 12 is a pictorial illustration of a left perspective view of an interior of a trailer toilet system in accordance with an illustrative embodiment.
Figure 13:
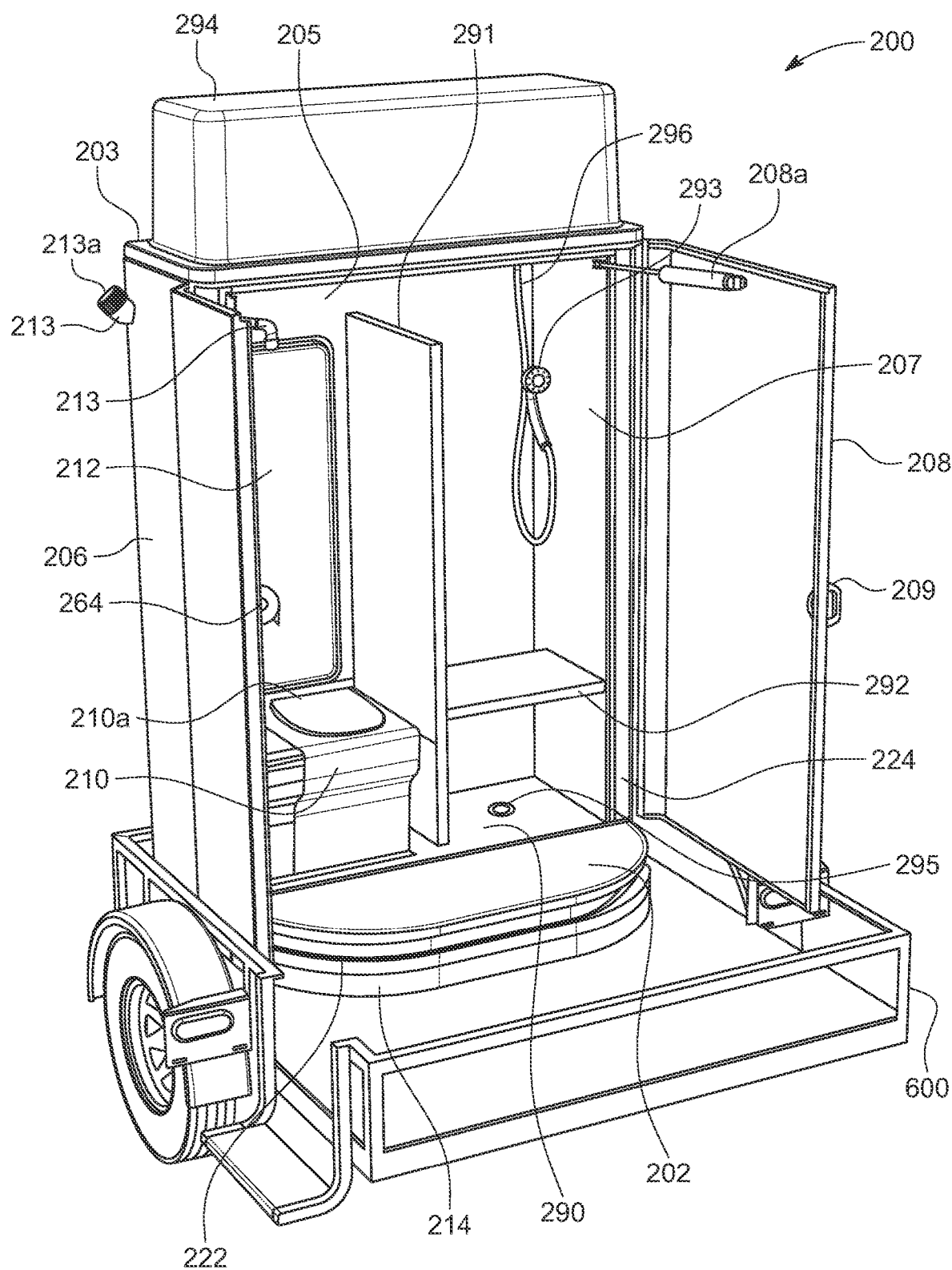
FIG. 13 is a pictorial illustration of a left perspective view of an interior of a trailer toilet system with access to a shower area in accordance with an illustrative embodiment.

Similar to the toilet system 100 discussed above, an enclosed compartment 201 of the toilet system 200 is shown to comprise of a platform 202, a roof 203, a back wall 205, a left side wall 206, a right side wall 207, and the one or more doors 208. The platform 202 is configured similarly to the toilet system 100 which provides a base onto which most of the components comprising the toilet system 200 are configured or integrated onto. In FIGS. 11 through 13, the one or more doors 208 are shown to be comprised of two doors which may be hingedly connected to the left side wall 206 and the right side wall 207, and which open to allow access to the interior of the enclosed compartment 201. In this configuration, the two doors 208 are provided with a handle 209 which may be of a type that locks. Consequently, the toilet system 200 may be used by a person with a means to unlock the two or more doors or by someone else with permission of the person with the means to unlock.

The one or more doors 208 may also include a mechanical door closing device and depicted in the figures as a hydraulic door closer 208a which is installed on both doors 208. It is to be understood that other mechanical door closing devices that close doors in a controlled manner may also be used. It is also to be understood that the one or more doors 208 may be provided without a mechanical door closing device.

Figure 14:
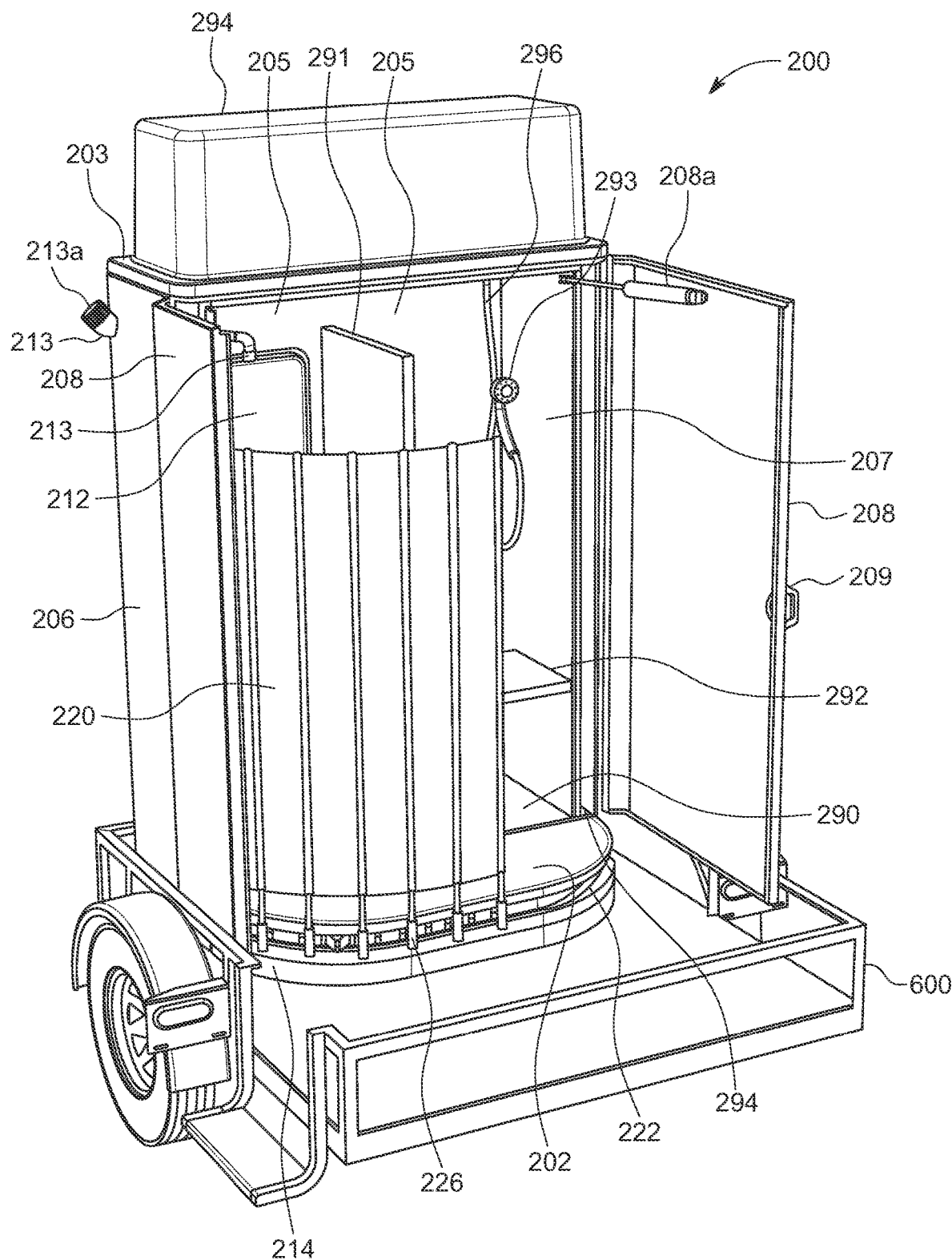
FIG. 14 is a pictorial illustration of a left perspective view of an interior of a trailer toilet system with a partially open curtain panel in accordance with an illustrative embodiment.

As with the toilet system 100, the one or more doors 208 open to the interior of the toilet system 200 and is accessible to someone for toilet or shower use. The toilet system 200 comprises of one or more curtain panels 220 to provide privacy during use. Similar to the toilet system 100, a pair of curtain panels 220 comprise the toilet system 200 which may be provided with one on each of the left side wall 206 and the right side wall 207 such that the curtain panels 220 may be pulled toward a front of the toilet system 200 to provide adequate privacy. It is to be understood that only one curtain panel 220 may also comprise the toilet system 200, wherein the one curtain panel may be provided on either a left side wall 206 or a right side wall 207 and capable of being pulled fully from one side to the other. The one or more curtain panels 220 may be of a height that provides adequate privacy during toilet use and shower use. As best seen in FIG. 14, the one or more curtains 220 are shown to have a height which is relatively more than half of a height of the enclosed compartment 201. It is to be understood that the height of the one or more curtains 220 may also be relatively equal to the height of the enclosed compartment 201. Also shown in FIG. 14, a bottom end of the curtain sits above the platform 202 such that there is some space for water used during a shower to spray out.

The one or more of curtain panels 220 are integrated onto the guide channel 222 which is configured onto the platform 202. The guide channel 222 is integrated along a perimeter of a bottom surface of the platform 202. The one or more curtain panels 220 may be configured such that the one or more curtain panels 220 are adjoined to a rail system 226 to allow the one or more curtain panels 220 to slide open and closed in an accordion like motion. The rail system 226 is integrated into the guide channel 222 which facilitates the sliding movement of the one or more curtain panels 220 between the open position and the closed position. It is to be understood that the one or more curtain panels 220 may be constructed in any suitable configuration to slide along the guide rail 222 to open and close.

Similar to the toilet system 100, the one or more curtain panels 220 are stored within the storage channels 224 that may be described as vertically extending gutters provided along each of the left side wall 206 and the right side wall 207. The one or more curtain panels 220 may be stored within their respective storage channels 224 when not in use or when the one or more doors 208 are moved to the closed position.

The interior of the toilet system 200 comprises of the toilet 210 arranged between the fixed enclosure and the shower area 290. In the illustrated form, the toilet 210 and the fixed enclosure 270 are in line and arranged relatively evenly with each other such that they conveniently form a bench, however, may also take any convenient form. In a preferred form, the toilet 210 is of a type that is fully functional such that the toilet 210 has a fill, flush, or rinse capability. The toilet 210 may also include a bidet feature (not shown). It is to be understood that alternatively any form of toilet may be used, including and not limited to a non-flushing kind and/or not provided with a bidet feature. Any functions of the toilet 210 may be controlled electronically via the electronic control assembly (not shown, but similar to the electronic control assembly 130 of the toilet system 100) or alternatively may have manual function capabilities such as a manual flush.

The toilet 210 may include a lid 210a that can be placed over an opening in the toilet 210 and simultaneously provide a convenient bench with the fixed enclosure 270. Maintaining the similarity with the toilet system 100, the toilet 210 of the toilet system 200 comprises of a heated seat. It is also to be understood that in alternate embodiments, the toilet 210 may be comprised of a seat that is not heated.

The toilet 210 is operatively connected to the clean water tank 212 and the waste tank 214. One or more electrically controlled valves (see block diagram FIG. 10, Valve Actuator in Toilet 110) ensure the toilet 210 functions properly where the flow of water in from the clean water tank 212 and out the waste tank 214 is controlled appropriately.

The clean water tank 212 and the waste tank 214 may each be equipped with a temperature control unit (not shown) which is electronically controlled via the electronic control assembly (see electronic control assembly 130 discussed above in FIGS. 9 and 10). The temperature control unit includes a temperature sensor, a heating element, and a cooling system which are contained within the clean water tank 212 and the waste tank 214 to regulate the temperatures of the clean water and the removed waste in their respective tanks. Regulating the temperatures of the clean water and the waste stored in their respective tanks serves the same purposes as discussed above in respect to the toilet system 100.

The clean water tank 212 and the waste tank 214 may each be equipped with a level sensor (not shown) to easily determine the level of clean water and waste in their respective tanks. The configurations and functions of the level sensors are discussed above in reference to the toilet system 100 and are generally the same in the toilet system 200. In one or more non-limiting embodiments, the level sensors may be provided within each of the clean water tank 212 and the waste tank 214 and a level of each tank may be indicated on the electronic display panel.

The clean water tank 212 may be of a size that can fit within the interior of the toilet system 200 and may be within the non-limiting range of six to ten gallons. Similar to the previous embodiment of the toilet system 100, the clean water tank 212 is also located within the interior of the toilet system 200 and connected to the back wall 205 of the enclosed compartment 201 relatively close to the toilet 210. It is also to be understood that alternatively the clean water tank 210 may be configured into the back wall 205 of the enclosed compartment 201 such that the clean water tank 210 is a part of the back wall 205. The clean water tank 212 is filled with clean water through a fill tube 213 which extends from the clean water tank 212 and exits out through the left side wall 206 and wherein a cap 213a closes an end of the fill tube 213 that sits outside of the enclosed compartment 201.

The waste tank 214 is provided as a storage tank to collect any waste that is flushed from the toilet 210 and water that is drained through the shower drain. In the non-limiting embodiment shown in FIGS. 11 through 14, the waste tank 214 may be provided on a bottom surface of the platform 202 by being configured onto the bottom surface of the platform 202. In alternate non-limiting embodiments, the waste tank may be provided on a bottom surface of the trailer that the trailer toilet system is manufactured onto. In any of these embodiments, the waste tank 214 may have an increased capacity of thirty to forty gallons to accommodate for waste increased due to use and the combination of clean water tank 212 and the shower water tank 294. A drain (not shown) similar to the toilet system 100 drain (see FIG. 2, drain 115) may be configured onto the waste tank 214 to provide a means to empty and clean the waste tank. The drain may be configured onto a side of the waste tank for easy access. An interior of the waste tank may be configured such that allows for easy drainage and cleaning with the interior of the waste tank angled toward the drain such that the waste collecting in the waste tank gravitationally moves toward the drain. The waste tank is emptied in a similar fashion as discussed above for the toilet system 100.

The trailer toilet system 200 also comprises of the lighting (not shown), the fixed enclosure which contains the battery and electronics that power the toilet system 200, and the toilet paper holder 264. These components are similar to the toilet system 100 and discussed above in respect to the toilet system 100.

In addition, the toilet system 200 comprises of a shower area 290 which includes and is not limited to the divider wall 291, the fold down seat 292, the showerhead 293, the shower water tank 294, and a shower drain 295. The divider wall 291, as seen in FIGS. 11 and 12, is a fold out section that is hingedly connected to the back wall 205 on the interior of the enclosed compartment 201. The divider wall 291, in a closed position, abuts and rests parallel against the back wall 205. In an open position, the divider wall 291 is turned to rest perpendicularly to the back wall 205, such that the toilet 210 is shielded from the shower area 290. In the open position of the divider wall 291, the fold down seat 292 may be lowered from the divider wall 291 for a person to use if they desire to sit and shower. The fold down seat 292 is hingedly connected to the divider wall 291 on a side that faces the shower area 290 when the divider wall 291 is in the open position.

The showerhead 293 is integrated into the roof 203 on the interior of the enclosed compartment 201. The showerhead 293 may be any reasonable type including and not limited to a standard fixed, a handheld, a dual, a rainfall, and others. The showerhead 293 is supplied with water from the shower tank 294. The shower water tank 294 is placed on a top of the roof 203 on an exterior of the enclosed compartment 201. The shower water tank 294 capacity may be in the range of twenty-five to thirty gallons and once placed on the top of the roof 203 the water will be gravity fed to the showerhead 293. The showerhead 293 may have a pipe 296 that extends into the roof 203 and has an opening at a top which may be closed with a cap 296a. The shower water tank 294 may have an opening (not shown) that corresponds to the opening with the cap 296a which leads to the showerhead 293. When the shower water tank 294 is placed on the roof 203, the opening in the shower water tank 294 is placed over the showerhead 293 pipe opening once the cap 296a is removed, such that water from the shower water tank 294 may gravity flow through the pipe 296 and into the showerhead 293.

The shower water tank 294 also comprises of a fill opening (not shown) that includes a cap, wherein the cap may be removed and the shower water tank is filled with water. Advantageously, the shower water tank 294 is sized such that it may be stored in the interior of the enclosed compartment 201, preferably in the shower area during travel or when the toilet system 200 is not in use, as shown in FIG. 12. The shower water tank 294 is generally stored when empty. To use, the shower water tank 294 is removed from within the interior of the enclosed compartment 201 and placed on the roof 203 on the exterior of the enclosed compartment 201 and filled with water through the fill opening.

The shower drain 295 is configured onto the platform in the shower area 290. The shower drain 295 is connected to the waste tank 214 such that water used during a shower may drain into the waste tank 214. The platform 202 in the shower area may be tapered toward the shower drain 295 such that most of the water will flow toward the shower drain 295 and drain into the waste tank 214.

The electronic control assembly (not shown) of the toilet system 200 is similar to the toilet system 100 electronic control assembly which has been described above in FIGS. 9 and 10. One difference being that the shower water tank 294 does not have an electronic interface with the electric control assembly but may have alternate means to determine water level such as a visual indicator on the shower water tank 294 itself.

Accordingly, the present description provides for various embodiments for a toilet system that may be mounted on an exterior of truck. The present disclosure also provides for a trailer toilet system that may be manufactured onto or alternatively be mounted onto a trailer that may be hitched to a vehicle and towed. Many advantages are offered by the toilet system as described above in one or more non-limiting embodiments.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A toilet system, wherein the toilet system is an independent enclosed structure providing access for toilet needs comprising:
    an enclosed compartment, having a platform, a left side wall, a right side wall, a roof, a back wall, and one or more doors to access an interior of the enclosed compartment;
    a toilet positioned within the interior of the enclosed compartment, wherein the toilet is a fully functional toilet having a fill, a flush, and a rinse function;
    a storage enclosure configured onto the platform and positioned adjacent to the toilet and having a hinged lid whereby items stored within the storage enclosure may be accessed by opening the hinged lid;
    a clean water tank operatively connected to the toilet that provides clean water for the toilet; and
    a waste tank operatively connected to the toilet that collects waste from the toilet.

2. The toilet system of claim 1, wherein the clean water tank is positioned within the enclosed compartment and mounted to the back wall on the interior of the enclosed compartment relatively close to the toilet, and
    wherein the waste tank is configured onto a bottom surface of the platform on an outside of the enclosed compartment.

3. The toilet system of claim 1, the toilet system further comprising of one or more curtain panels, wherein the one or more curtain panels are accessible when the one or more doors are in an open position and the one or more curtain panels provides privacy during toilet use.

4. The toilet system of claim 3, wherein the one or more curtain panels are adjoined to a rail system to allow the one or more curtain panels to slide open and closed, wherein the rail system is integrated into a guide channel which is configured along a bottom edge of the platform.

5. The toilet system of claim 3, wherein a storage channel is provided along each of the left side wall and the right side wall on the interior of the enclosed compartment and the one or more curtain panels are stored within the storage channel whereby the one or more curtain panels can be pulled out from the storage channel to slide into an open position to provide privacy and subsequently slide into a closed position for storage.

6. The toilet system of claim 1, wherein the clean water tank and the waste tank each have a temperature sensor to determine a temperature within the clean water tank and the waste tank, and wherein the clean water tank and the waste tank each have a heating element or a cooling element to adjust the temperatures within the clean water tank and the waste tank.

7. The toilet system of claim 1, wherein the clean water tank and the waste tank each have a level indicator, wherein the level indicator determines a level of water within the clean water tank and a level of waste within the waste tank.

8. The toilet system of claim 1, wherein the interior of the enclosed compartment is configured with a lighting.

9. The toilet system of claim 1, wherein the toilet system comprises of an electronic control assembly comprising of a controller and a local user interface within the interior of the enclosed compartment, wherein the electronic control assembly allows electronically controlling and monitoring various functions of the toilet system by receiving and interpreting data to monitor and perform the designated tasks.

10. The toilet system of claim 9, wherein an in-cab control assembly is remotely connected to the electronic control assembly, wherein the in-cab control assembly is an interface panel located outside of the enclosed compartment, whereby the in-cab control assembly contains a display to show a status of the various functions of the toilet system.

11. The toilet system of claim 1, wherein a solar panel is mounted to the roof on the exterior of the enclosed compartment.

12. The toilet system of claim 1, wherein the toilet system is positioned behind a cab of a large truck and mounted to the large truck.

13. A toilet system, wherein the toilet system is an independent enclosed structure providing access for toilet needs comprising:
    an enclosed compartment, having a platform, a left side wall, a right side wall, a roof, a back wall, and one or more doors to access an interior of the enclosed compartment;
    a toilet positioned within the interior of the enclosed compartment;
    a shower area within the interior of the enclosed compartment, wherein the shower area is adjacent to the toilet; and
    a clean water tank operatively connected to the toilet that provides clean water for the toilet;
    a waste tank operatively connected to the toilet and a shower drain in the shower area that collects waste from the toilet and the shower area.

14. The toilet system of claim 13, wherein the clean water tank is positioned within the enclosed compartment and mounted to the back wall on the interior of the enclosed compartment relatively close to the toilet, and
    wherein the waste tank is configured onto a bottom surface of the platform on an outside of the enclosed compartment.

15. The toilet system of claim 13, the toilet system further comprising of one or more curtain panels, wherein the one or more curtain panels are accessible when the one or more doors are in an open position and the one or more curtain panels provides privacy during toilet use.

16. The toilet system of claim 15, wherein the one or more curtain panels are adjoined to a rail system to allow the one or more curtain panels to slide open and closed, wherein the rail system is integrated into a guide channel which is configured along a bottom edge of the platform.

17. The toilet system of claim 15, wherein a storage channel is provided along each of the left side wall and the right side wall on the interior of the enclosed compartment and the one or more curtain panels are stored within the storage channel whereby the one or more curtain panels can be pulled out from the storage channel to slide into an open position to provide privacy and subsequently slide into a closed position for storage.

18. The toilet system of claim 12, wherein the clean water tank and the waste tank each have a temperature sensor to determine a temperature within the clean water tank and the waste tank, and wherein the clean water tank and the waste tank each have a heating element or a cooling element to adjust the temperatures within the clean water tank and the waste tank.

19. The toilet system of claim 12, wherein the clean water tank and the waste tank each have a level indicator, wherein the level indicator determines a level of water within the clean water tank and a level of waste within the waste tank.

20. The toilet system of claim 12, wherein the interior of the enclosed compartment is configured with a lighting.

21. The toilet system of claim 12, wherein the toilet system comprises of an electronic control assembly comprising of a controller and a local user interface within the interior of the enclosed compartment, wherein the electronic control assembly allows electronically controlling and monitoring various functions of the toilet system by receiving and interpreting data to monitor and perform the designated tasks.

22. The toilet system of claim 12, further comprising a fixed enclosure configured onto the platform and positioned adjacent to the toilet, whereby the fixed enclosure contains a battery.

23. The toilet system of claim 12, further comprising a storage enclosure configured onto the platform and positioned adjacent to the toilet and having a hinged lid whereby items stored within the storage enclosure may be accessed by opening the hinged lid.

24. The toilet system of claim 12, the shower area comprising:
a divider wall hingedly connected to the back wall on the interior of the enclosed compartment, wherein the divider wall shields the toilet from the shower area when the divider wall is in an open position whereby in the open position the divider wall is positioned perpendicularly to the back wall on the interior of the enclosed compartment;
a showerhead mounted into the roof on the interior of the enclosed compartment, wherein a pipe from the showerhead extends into the roof of the enclosed compartment; and
the shower drain integrated onto the platform on the interior of the enclosed compartment, whereby the drain is connected to the waste tank, whereby shower water drains into the waste tank.

25. The toilet system of claim 24, wherein the showerhead is supplied with water from a shower water tank, wherein the shower water tank is placed on a top of the roof on an exterior of the enclosed compartment, whereby water in the shower water tank is gravity fed to the showerhead through the pipe that extends into the roof.

26. The toilet system of claim 12, wherein the toilet system is manufactured onto a trailer,
wherein the waste tank is configured onto a bottom surface of the trailer.

27. A toilet system, wherein the toilet system is an independent enclosed structure providing access for toilet needs comprising:
an enclosed compartment, having a platform, a left side wall, a right side wall, a roof, a back wall, and one or more doors to access an interior of the enclosed compartment;
a toilet positioned within the interior of the enclosed compartment, wherein the toilet is a fully functional toilet having a fill, a flush, and a rinse function;
a fixed enclosure configured onto the platform and positioned adjacent to the toilet, whereby the fixed enclosure contains a battery;
a clean water tank operatively connected to the toilet that provides clean water for the toilet; and
a waste tank operatively connected to the toilet that collects waste from the toilet.

* * * * *